United States Patent
Bian et al.

(10) Patent No.: US 11,002,916 B1
(45) Date of Patent: May 11, 2021

(54) NON-PLANAR GRATING COUPLERS FOR ANTENNAS

(71) Applicant: GLOBALFOUNDRIES U.S. Inc., Santa Clara, CA (US)

(72) Inventors: Yusheng Bian, Ballston Lake, NY (US); Ajey Poovannummoottil Jacob, Watervliet, NY (US); Michal Rakowski, Ballston Spa, NY (US); Bo Peng, Wappingers Falls, NY (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/682,502

(22) Filed: Nov. 13, 2019

(51) Int. Cl.
*G02B 6/34* (2006.01)

(52) U.S. Cl.
CPC ..................... *G02B 6/34* (2013.01)

(58) Field of Classification Search
CPC ......................................... G02B 6/34
See application file for complete search history.

(56) References Cited

U.S. PATENT DOCUMENTS

| | | | |
|---|---|---|---|
| 7,936,448 B2 | 5/2011 | Albuquerque et al. | |
| 8,988,754 B2 | 3/2015 | Sun et al. | |
| 9,274,283 B1* | 3/2016 | Ellis-Monaghan | G02B 6/34 |
| 2015/0346340 A1 | 12/2015 | Yaacobi et al. | |
| 2019/0107672 A1 | 4/2019 | Jacob | |

OTHER PUBLICATIONS

Sun et al., "Large-scale nanophotonic phased array", Nature vol. 493, pp. 195-199 (Jan. 10, 2013).
Abediasl et al., "Monolithic optical phased-array transceiver in a standard SOI CMOS process", Optics Express vol. 23, Issue 5, pp. 6509-6519 (2015).
Sodagar et al., "High-efficiency and wideband interlayer grating couplers in multilayer Si/SiO2/SiN platform for 3D integration of optical functionalities", Optics Express vol. 22, Issue 14, pp. 16767-16777 (2014).
Zhang et al., "Sub-wavelength Spacing Optical Phase Array Nanoantenna Emitter with Vertical Silicon Photonic Vias", 2018 Optical Fiber Communications Conference and Exposition (OFC), San Diego, CA, 2018, pp. 1-3.
Pita et al., "Design of a compact CMOS-compatible photonic antenna by topological optimization", Optics Express vol. 26, Issue 3, pp. 2435-2442 (2018).
Bian et al., "Multiple-Layer Arrangements Using Tunable Materials to Provide Switchable Optical Components" filed Nov. 26, 2018 as U.S. Appl. No. 16/199,727.
Bian et al., "Non-Planar Waveguide Structures" filed Jul. 10, 2019 as U.S. Appl. No. 16/507,642.
Jacob et al., "Grating Couplers with Multiple Configurations" filed Jun. 5, 2018 as U.S. Appl. No. 16/000,249.

* cited by examiner

*Primary Examiner* — John Bedtelyon
(74) *Attorney, Agent, or Firm* — Thompson Hine LLP; Francois Pagette

(57) ABSTRACT

Structures including a grating coupler and methods of fabricating such structures. The structure includes a waveguide core, a bend, and a grating coupler coupled to the waveguide core by the bend. The grating coupler includes grating structures that are positioned with a spaced relationship in a layer stack above the bend.

20 Claims, 6 Drawing Sheets

NON-PLANAR GRATING COUPLERS FOR ANTENNAS

BACKGROUND

The present invention relates to photonics chips and, more particularly, to structures including a grating coupler and methods of fabricating such structures.

Light Detection and Ranging (LIDAR) is a laser-mapping technology that measures distance to a target by illuminating the target with pulsed laser light and measuring pulses reflected from the target with a sensor. LIDAR is used in, for example, autonomous robots and self-driving cars. A LIDAR system may be embodied in a photonics chip that integrates optical components, such as waveguides and bends, and electronic components, such as field-effect transistors, into a unified platform. Among other factors, layout area, cost, and operational overhead may be reduced by the integration of both types of components in the photonics chip.

Grating couplers are commonly used in photonics chips to provide antennas in LIDAR systems, as well as to provide antennas in silicon photonics phased arrays. Grating couplers are planar structures that direct laser pulses off-chip at a given emission angle. Due to limitations placed on the emission angle by their planar construction, grating couplers inherently have a restricted vertical field of view. For example, the emission angle out of the plane of a grating coupler may be limited to +/−15 degrees.

Improved structures including a grating coupler and methods of fabricating such structures are needed.

SUMMARY

In an embodiment of the invention, a structure includes a waveguide core, a bend, and a grating coupler coupled to the waveguide core by the bend. The grating coupler includes a plurality of grating structures positioned with a spaced relationship in a layer stack above the bend.

In an embodiment of the invention, a method includes forming a waveguide core, forming a bend, and forming a grating coupler coupled to the waveguide core by the bend. The grating coupler includes a plurality of grating structures positioned with a spaced relationship in a layer stack above the bend.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
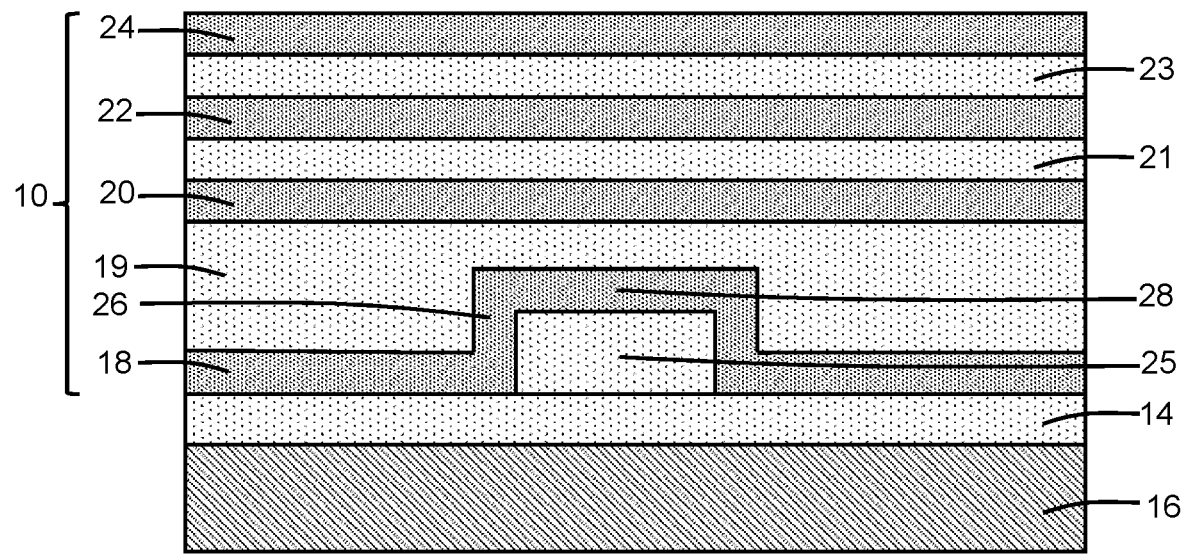
FIG. 1 is a cross-sectional view of a structure at an initial fabrication stage of a processing method in accordance with embodiments of the invention.

With reference to FIG. 1 and in accordance with embodiments of the invention, a layer stack 10 is formed in a region of a silicon-on-insulator (SOI) wafer. The SOI wafer may include a device layer (not shown), a buried insulator layer 14, and a substrate 16 separated from the device layer by the buried insulator layer 14. The buried insulator layer 14 may be composed of a dielectric material, such as silicon dioxide, and the device layer and substrate 16 may be composed of a single-crystal semiconductor material, such as single-crystal silicon.

The layer stack 10 includes layers 18, 20, 22, 24 that are composed of a given material and layers 19, 21, 23 that are composed of a given material having a different composition than the material of the layers 18, 20, 22, 24. The layers 18, 20, 22, 24 and the layers 19, 21, 23 alternate with position in a vertical direction within the layer stack 10 such that the materials also alternate. In an embodiment, the layers 18, 20, 22, 24 may be composed of a dielectric material, such as silicon nitride, deposited by chemical vapor deposition. In an alternative embodiment, the layers 18, 20, 22, 24 may be composed of silicon carbon nitride (e.g., nitrogen-doped silicon carbide (SiCN)), commonly known as NBloK, deposited by chemical vapor deposition. In an embodiment, the layers 18, 20, 22, 24 may be composed of a non-dielectric material, such as polycrystalline silicon (i.e., polysilicon) or amorphous silicon, deposited by chemical vapor deposition. The layers 19, 21, 23 may be composed of a dielectric material, such as silicon dioxide, having a lower index of refraction than the material constituting the layers 18, 20, 22, 24. The layer stack 10 may be arranged directly on the buried insulator layer 14 or, in an alternative embodiment, on one or more dielectric layers (not shown) positioned between the layer stack 10 and the buried insulator layer 14.

The bottommost layer 18 in the layer stack 10 is deposited conformally over a mandrel 25. In that regard, the mandrel 25 may be patterned by lithography and etching processes from a dielectric layer deposited on the buried insulator layer 14. The bottommost layer 18, which is deposited after the mandrel 25 is formed, includes sections 26 on and adjacent to the side surfaces 25a (FIG. 2) of the mandrel 25 and a section 28 on and adjacent to the top surface 25b (FIG. 2) of the mandrel 25. The sections 26 of the layer 18 may include a concave curvature, which is not shown for simplicity of illustration, at and near the lower corners of the mandrel 25 defined by the intersections between the side surfaces 25a and the buried insulator layer 14.

Figure 2:
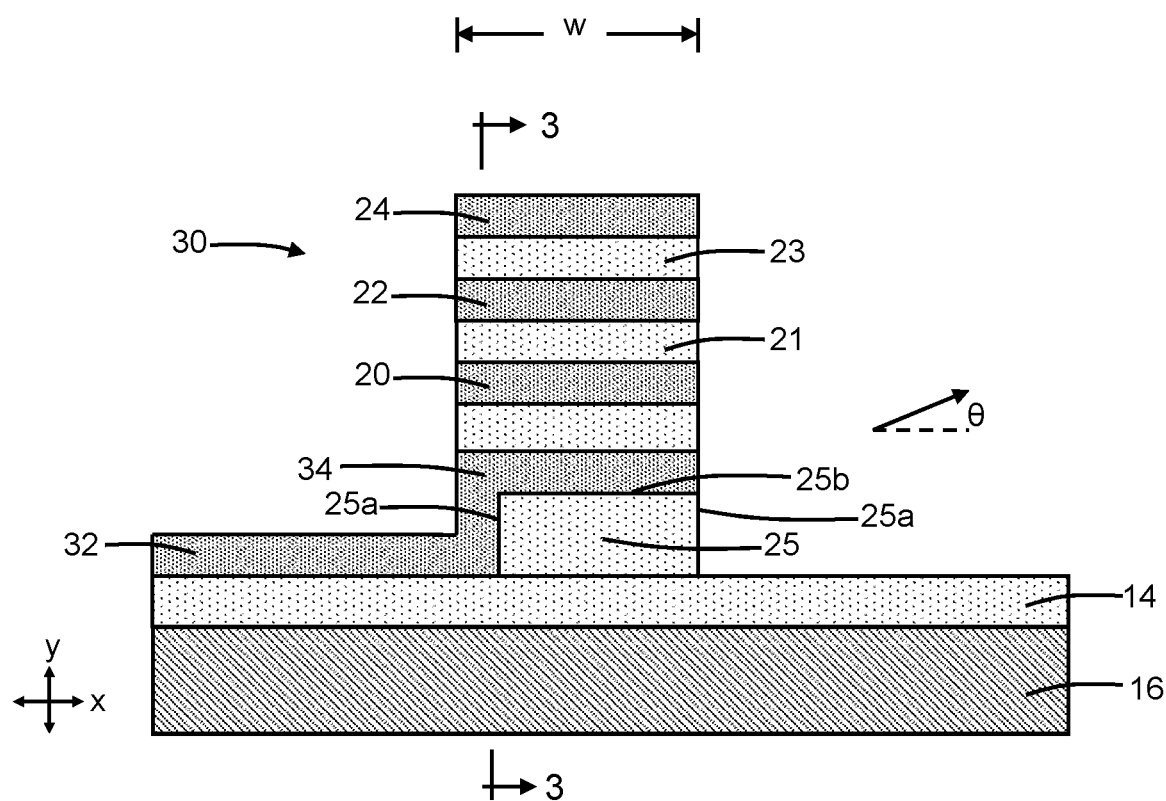
FIG. 2 is a cross-sectional view of the structure at a fabrication stage subsequent to FIG. 1.
Figure 3:
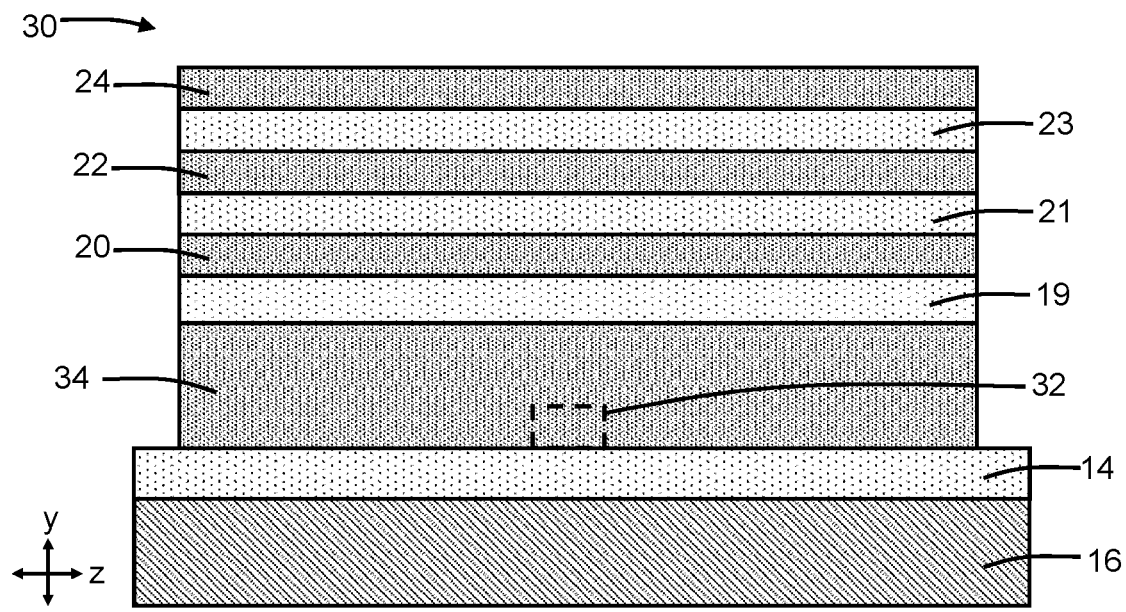
FIG. 3 is a cross-sectional view taken generally along line 3-3 in FIG. 2.

With reference to FIGS. 2, 3 in which like reference numerals refer to like features in FIG. 1 and at a subsequent fabrication stage, the layers 20, 21, 22, 23, 24 of the layer stack 10 are patterned with lithography and etching processes in which an etch mask is formed over the layer stack 10 and the masked layers 20, 21, 22, 23, 24 are etched with an etching process, such as reactive ion etching. The patterning of the layers 20, 22, 24 defines a grating coupler 30 with the patterned layers 20, 22, 24 providing grating structures that are positioned in a vertical direction relative to the SOI wafer. The patterned layers 20, 22, 24 of the grating coupler 30 have a spaced relationship in which the grating structures are located at different distances in the layer stack 10 from the buried insulator layer 14.

Figure 3A:
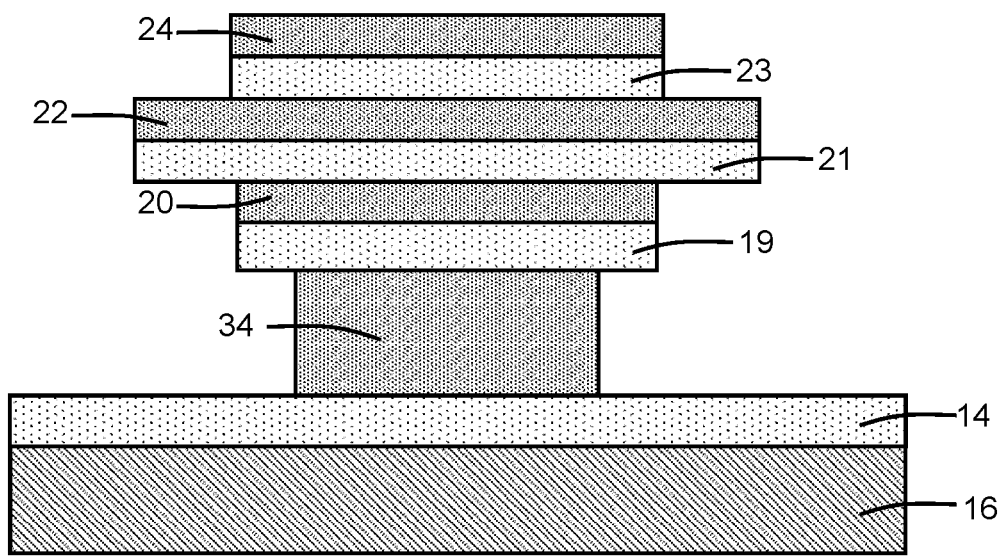
FIGS. 3A-3C are cross-sectional views of structures in accordance with alternative embodiments of the invention.

The patterned layers 20, 22, 24 of the grating coupler 30 are disconnected from each other, and the spaces between the patterned layers 20, 22, 24 are filled by the dielectric material of the patterned layers 21, 23. In an embodiment, the patterned layers 20, 22, 24 may have equal dimensions. For example, the patterned layers 20, 22, 24 may have equal widths, w. In an alternative embodiment and as shown in FIG. 3A, the patterned layers 20, 22, 24 may have unequal dimensions that are provided by individually patterning the layers 20, 22, 24.

The layers 18, 19 of the layer stack 10 are patterned, after patterning the grating coupler 30, with lithography and etching processes in which an etch mask is formed over the grating and layers 18, 19, and the masked layers 18, 19 are etched with an etching process, such as reactive ion etching. The patterning of the layer 18 defines a waveguide core 32 and a bend 34 that couples the waveguide core 32 to the grating coupler 30.

The bend 34, which is located adjacent to the mandrel 25, may include one of the sections 26 of the layer 18 and the entirety of the section 28 of the layer 18. In an alternative embodiment, the bend 34 may only include one of the sections 26 of the layer 18 and not include the section 28 of the layer 18. In an alternative embodiment, the bend 34 may include one of the sections 26 of the layer 18 and a portion of the section 28 of the layer 18.

The dimensions (i.e., the length and width) of the patterned layers 20, 22, 24 may be adjusted to be equal or substantially equal to the dimensions of the bend 34. For example, the dimensions of each of the patterned layers 20, 22, 24 may be equal or substantially equal to the dimensions of the top surface of the patterned section 28 of the layer 18. For example, the patterned layers 20, 22, 24 and the patterned section 28 of the layer 18 may have equal widths, w. In an embodiment, the grating structures of the grating coupler 30 may be arranged at least in part directly over the bend 34. In an embodiment, the waveguide core 32 may be narrower in width than the bend 34.

The waveguide core 32 guides optical signals (e.g., modulated laser pulses) from a laser 41 to the grating coupler 30. The bend 34, which curves upwardly in a vertical direction relative to the waveguide core 32, guides optical signals arriving from the waveguide core 32 to the grating coupler 30. The grating coupler 30 may operate as an antenna for directing the optical signals off-chip at an emission angle, θ, that has a significant component parallel to the top surface of the buried insulator layer 14. The bend 34 provides a change in direction that redirects the optical signals from being guided within the plane of the waveguide core 32 to being guided in a plane containing the grating coupler 30. The plane containing the grating coupler 30 may be oriented in a vertical or substantially vertical position relative to a horizontal plane containing the waveguide core 32.

The emission angle of the optical signals from the grating coupler 30 is sloped or inclined relative to the horizontal plane. The ability to provide an emission angle in a direction that is substantially horizontal contrasts with conventional grating coupler antennas, which are limited to emission angles in a direction that is substantially vertical. In embodiments, a substantially horizontal emission angle may be less than or equal to 30° relative to the horizontal plane. For comparison, a substantially vertical emission angle may be greater than or equal to 60° relative to the horizontal plane. The substantially horizontal emission angle may be provided without the need to mechanically rotate the photonics chip carrying the antenna. The grating coupler 30 may be replicated on the photonics chip to provide an array of antennas that feature different emission angles.

Figure 3B:
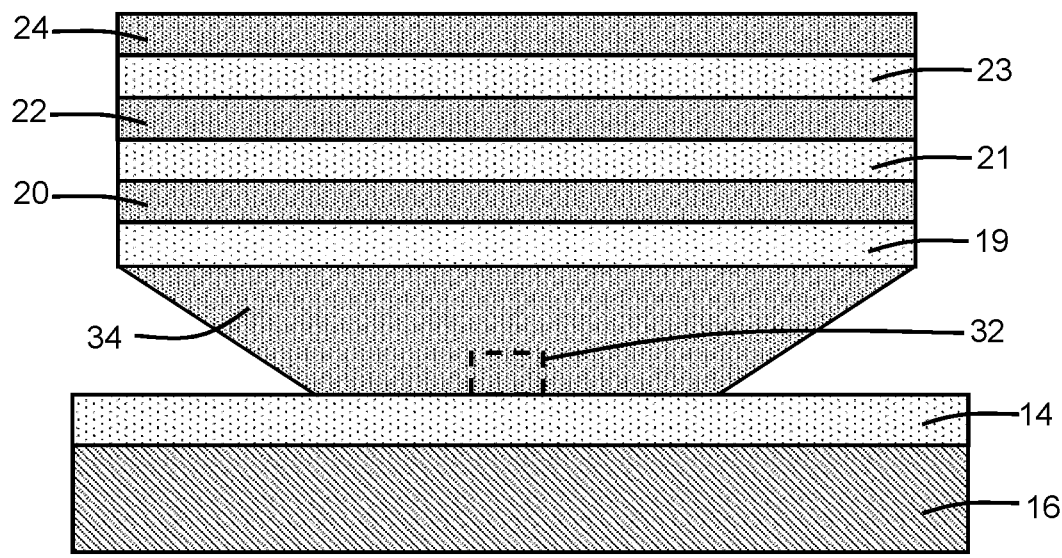
Figure 3C:
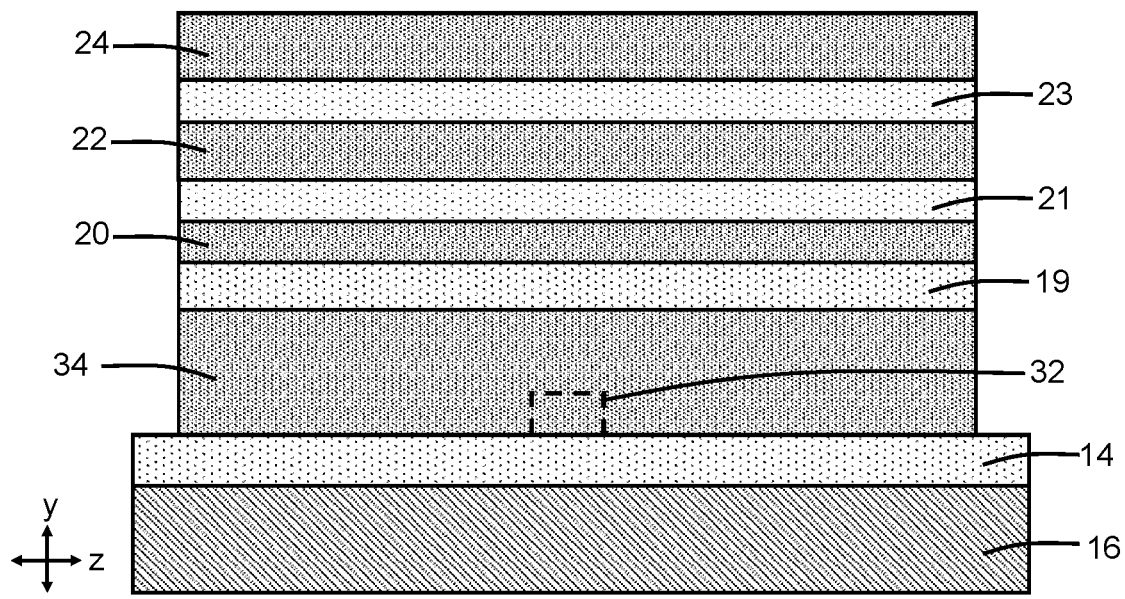

In an alternative embodiment and as shown in FIG. 3B, the bend 34 may include a taper that widens with increasing distance from the waveguide core 32. In an embodiment, the patterned layers 20, 22, 24 of the grating coupler 30 may be periodically arranged with a uniform pitch and duty cycle. In an alternative embodiment and as shown in FIG. 3C, the patterned layers 20, 22, 24 of the grating coupler 30 may have apodized (i.e., aperiodic) positions with a pitch and/or a duty cycle that varies as a function of distance from the bend 34. The thickness of the layers 20, 21, 22, 23, 24 may be used to determine the pitch and duty cycle of the grating structures of the grating coupler 30. In an alternative embodiment, the patterned layers 20, 22, 24 of the grating coupler 30 may be laterally offset relative to the bend 34 in a "stair-step" arrangement.

In an embodiment, the grating coupler 30, the waveguide core 32, and the bend 34 may be composed of the same material. For example, the grating coupler 30, the waveguide core 32, and the bend 34 may be composed of the same dielectric material, such as silicon nitride. In an alternative embodiment, the grating coupler 30, the waveguide core 32, and the bend 34 may be composed of different materials. For example, the waveguide core 32 may be composed of single-crystal silicon, and the bend 34 and grating coupler 30 may be composed of, for example, polysilicon. In an alternative embodiment, the grating structures of the grating coupler 30 may be composed of different materials. For example, the patterned layers 20 and 24 providing some of the grating structures may be composed of silicon nitride, and the patterned layer 22 providing another of the grating structures may be composed of polysilicon.

Figure 4:
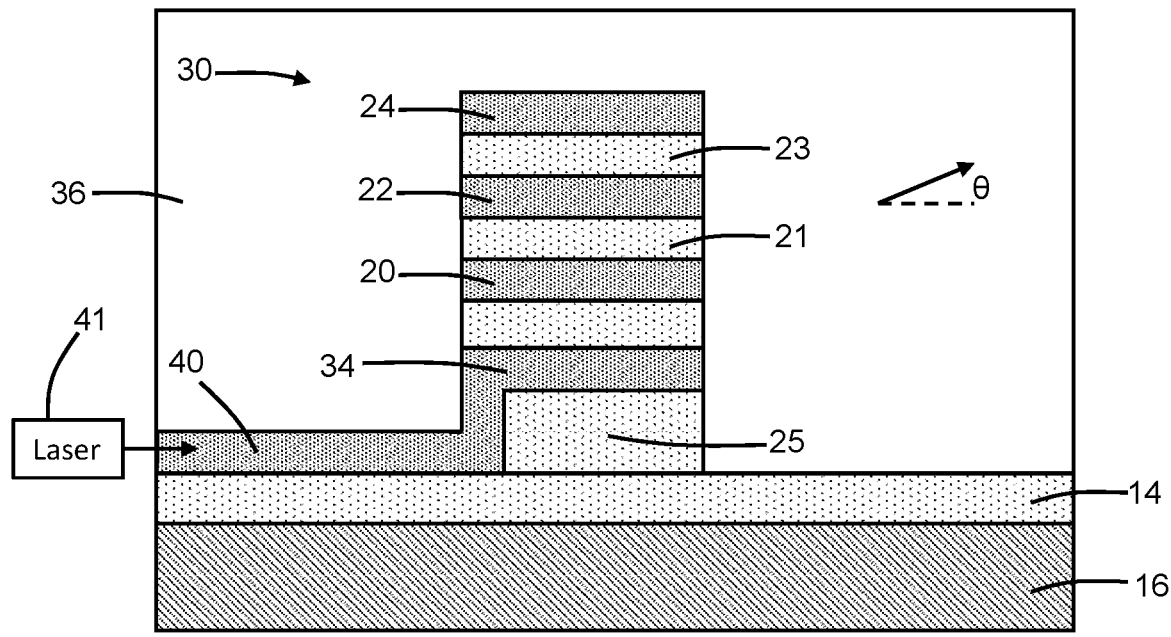
FIG. 4 is a cross-sectional view of the structure at a fabrication stage subsequent to FIG. 3.

With reference to FIG. 4 in which like reference numerals refer to like features in FIG. 2 and at a subsequent fabrication stage, an interconnect structure 36 may be formed by middle-of-line and back-end-of-line processing over the entire SOI wafer. The interconnect structure 36 may include dielectric layers and metallization that is coupled with electronic components and active optical components that are integrated into a photonics chip that includes the antenna. For example, the electronic components may include field-effect transistors that are fabricated by front-end-of-line processing.

The interconnect structure 36 should be free of metallization on the emission side of the grating coupler 30 in order to avoid blocking or obstructing the modulated laser pulses emitted from the antenna. The distance between the grating coupler 30 and the chip edge can be in the range of several microns to tens, or even hundreds, of microns.

Figure 5:
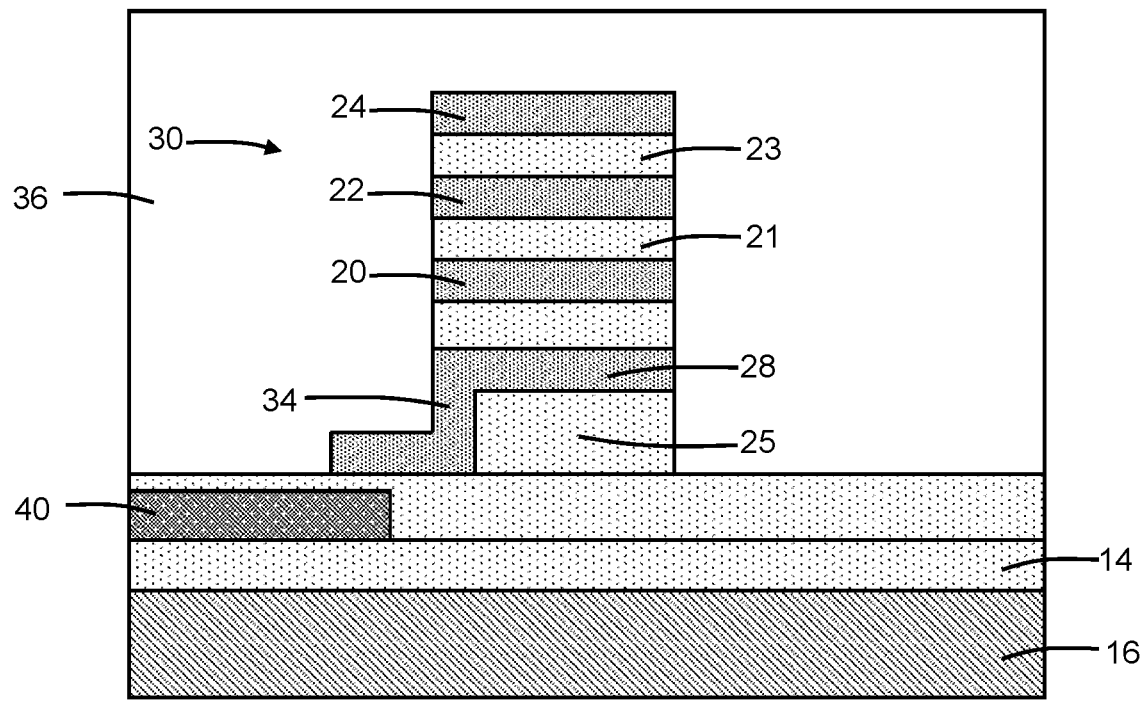
FIGS. 5-8 are cross-sectional views of structures in accordance with alternative embodiments of the invention.

With reference to FIG. 5 in which like reference numerals refer to like features in FIG. 4 and in accordance with alternative embodiments of the invention, a waveguide core 40 may be formed independently from the formation of the bend 34 and the waveguide core 40 may be coupled by the bend 34 to the grating coupler 30. The grating coupler 30 and bend 34 are located above the waveguide core 40 in the antenna. The waveguide core 40 may be formed by patterning the single-crystal semiconductor material of the device layer of the SOI wafer with lithography and etching processes in which an etch mask is formed over the device layer and the masked device layer is etched with an etching process, such as reactive ion etching. Optical signals are coupled from the waveguide core 40 upward to the bend 34 and then directed by the bend 34 to the grating coupler 30.

Figure 6:
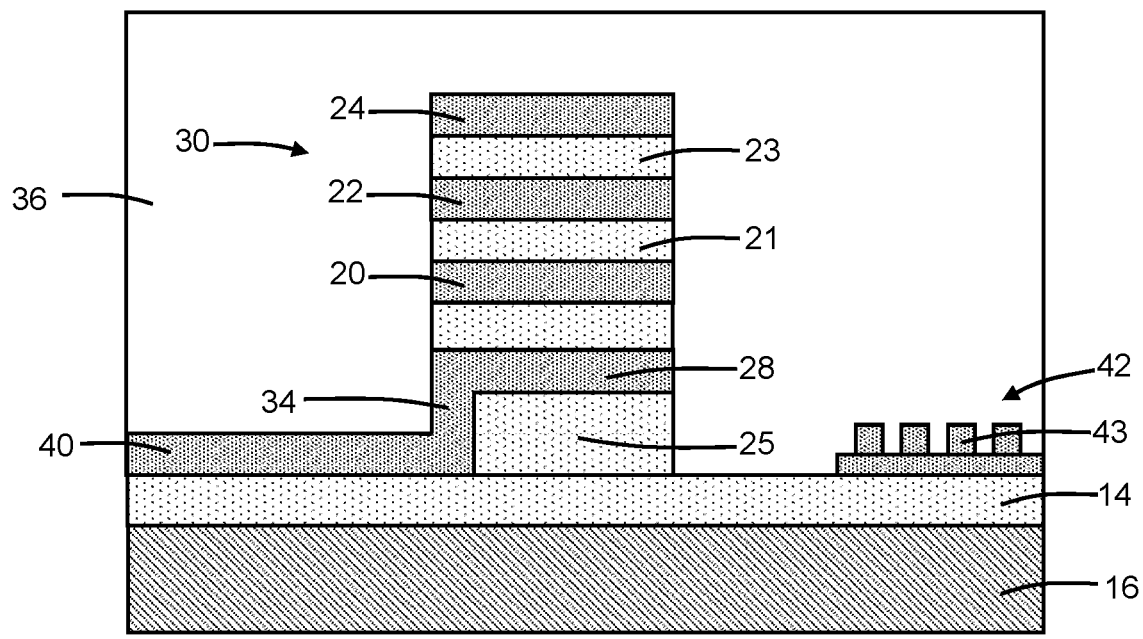

With reference to FIG. 6 in which like reference numerals refer to like features in FIG. 4 and in accordance with alternative embodiments of the invention, the grating coupler 30 may be integrated on a photonics chip with a grating coupler 42 having a planar construction to provide a more complex antenna. The grating structures of the grating coupler 30 are spaced in a direction (e.g., the vertical direction) relative to the SOI wafer, and the grating structures 43 of the grating coupler 42 are spaced in a direction (e.g., the horizontal direction) that is transverse to the direction of the spaced relationship of the grating structures of the grating coupler 30.

The combination of the grating couplers 30, 42 may permit optical signals to be emitted over a widened range of emission angles, which provides an antenna having an expanded field of view. In an embodiment, the grating coupler 30 may emit optical signals over a given range of emission angles, and the grating coupler 42 may emit optical signals over a different range of emission angles. In an embodiment, the grating coupler 30 may emit optical signals over a given range of emission angles, and the grating coupler 42 may emit optical signals over a similar range of emission angles. An additional grating coupler like grating coupler 30, but with a different emission angle as tailored by, for example, pitch and/or duty cycle, may be added to the antenna to further expand the field of view. The grating couplers 30, 42 may be replicated to provide a heterogeneous array of antennas.

Figure 7:
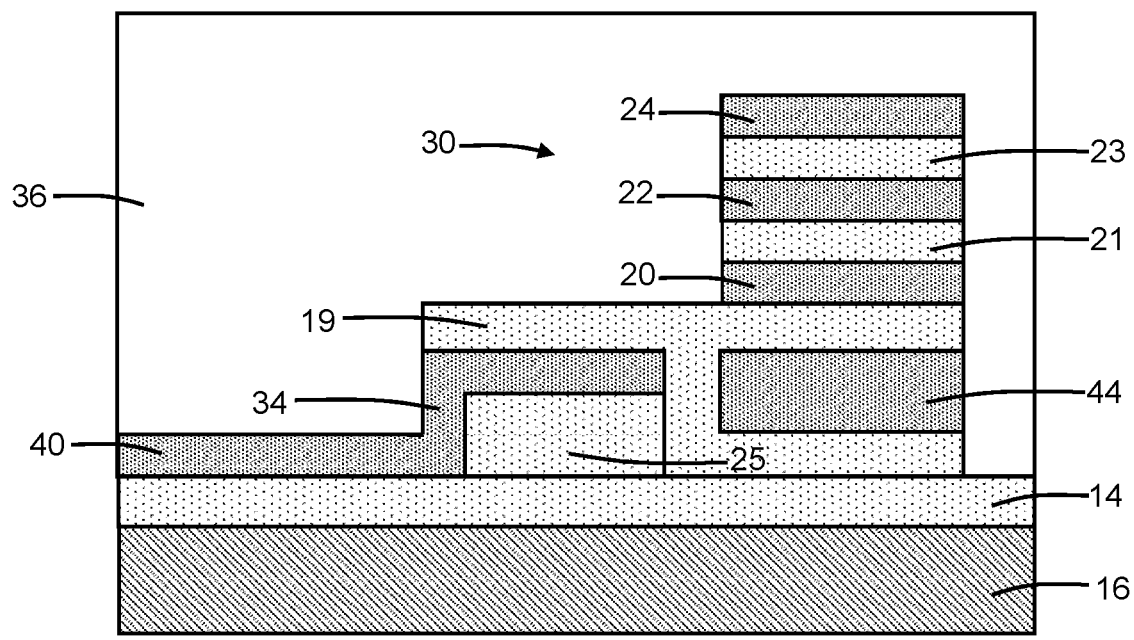

With reference to FIG. 7 in which like reference numerals refer to like features in FIG. 4 and in accordance with alternative embodiments of the invention, the grating coupler 30 may include a layer 44 that is positioned adjacent to the bend 34 and patterned when the layers 20, 22, 24 are patterned. Optical signals are transferred from the bend 34 to the patterned layer 44. Because of the addition of the patterned layer 44, the grating coupler 30 may be offset laterally from the bend 34 and no longer directly over the bend 34. In an embodiment, the grating coupler 30 may be composed of a dielectric material, such as silicon nitride, and the waveguide core 32 and bend 34 may be composed of polysilicon.

Figure 8:
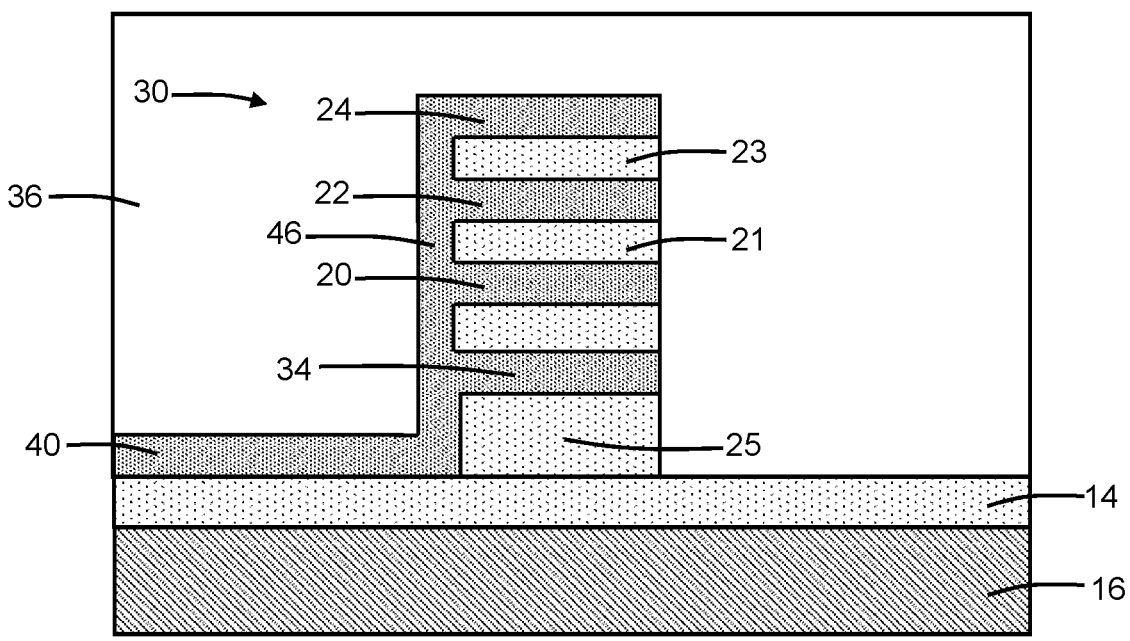

With reference to FIG. 8 in which like reference numerals refer to like features in FIG. 4 and in accordance with alternative embodiments of the invention, the patterned layers 20, 22, 24 providing the grating structures of the grating coupler 30 may be connected together by a layer 46. In an embodiment, the layer 46 is arranged at aligned side edges of the grating structures of the grating coupler 30. The layer 46 may directly connect the grating structures of the grating coupler 30 to the bend 34. The layer 46 may be thinner than the grating structures of the grating coupler 30.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a substrate;
   a waveguide core in a first plane relative to the substrate;
   a bend that curves upwardly relative to the waveguide core and away from the first plane; and
   a first grating coupler coupled to the waveguide core by the bend, the first grating coupler including a first plurality of grating structures positioned with a spaced relationship above the bend in a second plane that is oriented substantially perpendicular to the first plane.

2. The structure of claim 1 wherein the first plurality of grating structures have substantially equal dimensions.

3. The structure of claim 1 wherein the first plurality of grating structures have unequal dimensions.

4. The structure of claim 1 wherein the bend includes a taper.

5. The structure of claim 1 wherein the first plurality of grating structures have a uniform pitch and a uniform duty cycle.

6. The structure of claim 1 wherein the first plurality of grating structures have a pitch that is apodized and/or a duty cycle that is apodized.

7. The structure of claim 1 wherein the first plurality of grating structures are spaced in a first direction in the second plane, and further comprising:
   a second grating coupler including a second plurality of grating structures that are spaced in a second direction transverse to the first direction.

8. The structure of claim 1 wherein the waveguide core is comprised of a first material, and the bend and the first grating coupler are comprised of a second material having a different composition than the first material.

9. The structure of claim 1 wherein the first plurality of grating structures are positioned directly over a portion of the bend.

10. The structure of claim 1 wherein the first plurality of grating structures are laterally offset from the bend.

11. The structure of claim 10 wherein at least one of the first plurality of grating structures is laterally adjacent to a portion of the bend.

12. The structure of claim 1 wherein the bend is arranged in part over the waveguide core.

13. The structure of claim 1 wherein at least one of the first plurality of grating structures is comprised of a first material, and at least one of the first plurality of grating structures is comprised of a second material having a different composition than the first material.

14. The structure of claim 1 wherein the first grating coupler includes a layer connecting the first plurality of grating structures, and the layer is thinner than the first plurality of grating structures.

15. The structure of claim 1 wherein the first grating coupler is configured to function as an antenna for off-chip emission of laser pulses at an emission angle.

16. The structure of claim 1 wherein a dielectric material fills spaces between the first plurality of grating structures.

17. A method comprising:
forming a waveguide core in a first plane relative to a substrate;
forming a bend that curves upwardly relative to the waveguide core and away from the first plane; and
forming a grating coupler coupled to the waveguide core by the bend,
wherein the grating coupler includes a plurality of grating structures positioned with a spaced relationship above the bend in a second plane that is oriented substantially perpendicular to the first plane.

18. The method of claim 17 wherein the plurality of grating structures are positioned with the spaced relationship in a vertical direction relative to the bend.

19. The method of claim 17 wherein the plurality of grating structures are patterned from a plurality of layers deposited to form a layer stack, and the plurality of layers are composed of one or more materials.

20. The method of claim 17 wherein the waveguide core is comprised of a first material, and the bend and the grating coupler are comprised of a second material having a different composition than the first material.

* * * * *